(No Model.) 3 Sheets—Sheet 2.

C. S. BRADLEY.
DYNAMO ELECTRIC MACHINERY.

No. 394,819. Patented Dec. 18, 1888.

WITNESSES:

Charles S. Bradley INVENTOR,

BY
McTigher Worthington
ATTORNEYS, (No Model.) 3 Sheets—Sheet 3.
C. S. BRADLEY.
DYNAMO ELECTRIC MACHINERY.
No. 394,819. Patented Dec. 18, 1888.
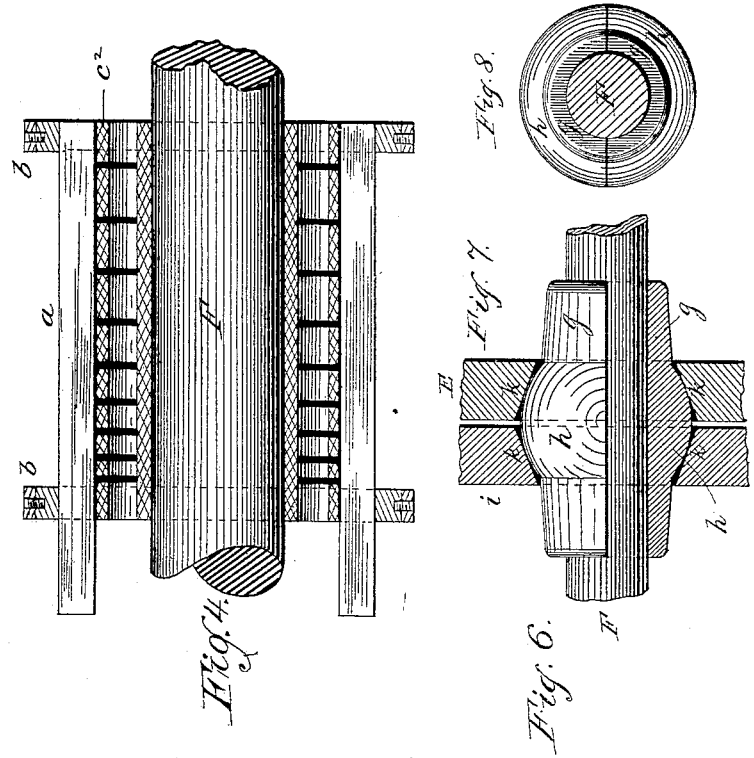
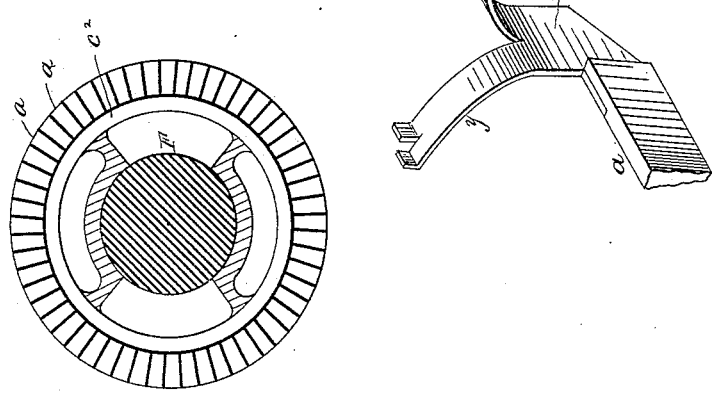
WITNESSES:
CW Benjamin
E. D. Myers
Charles S. Bradley INVENTOR.
BY
McTighe & Worthington
ATTORNEYS.

UNITED STATES PATENT OFFICE.

CHARLES S. BRADLEY, OF YONKERS, NEW YORK.

DYNAMO-ELECTRIC MACHINERY.

SPECIFICATION forming part of Letters Patent No. 394,819, dated December 18, 1888.

Application filed January 10, 1888. Serial No. 260,350. (No model.)

*To all whom it may concern:*

Be it known that I, CHARLES S. BRADLEY, a citizen of the United States, residing at Yonkers, in the county of Westchester and State of New York, have invented certain new and useful Improvements in Dynamo - Electric Machines or Electric Motors; and I do hereby declare the following to be a full, clear, and exact description of the invention, such as will enable others skilled in the art to which it appertains to make and use the same.

In a pending application, Serial No. 245,172, I have described and claimed a special construction of armature and other parts of a dynamo - electric machine or electric motor having especial reference to a multipolar machine. While retaining the features of armature-winding, the relations of the same to the cores of the field-magnet, and mode of connecting the armature-conductor, my present invention has for its object certain improvements in the arrangement and construction of the field-magnets and various other parts of the complete machine.

The invention accordingly consists in the construction and arrangement of devices, substantially as hereinafter fully described and claimed.

Figure 1:
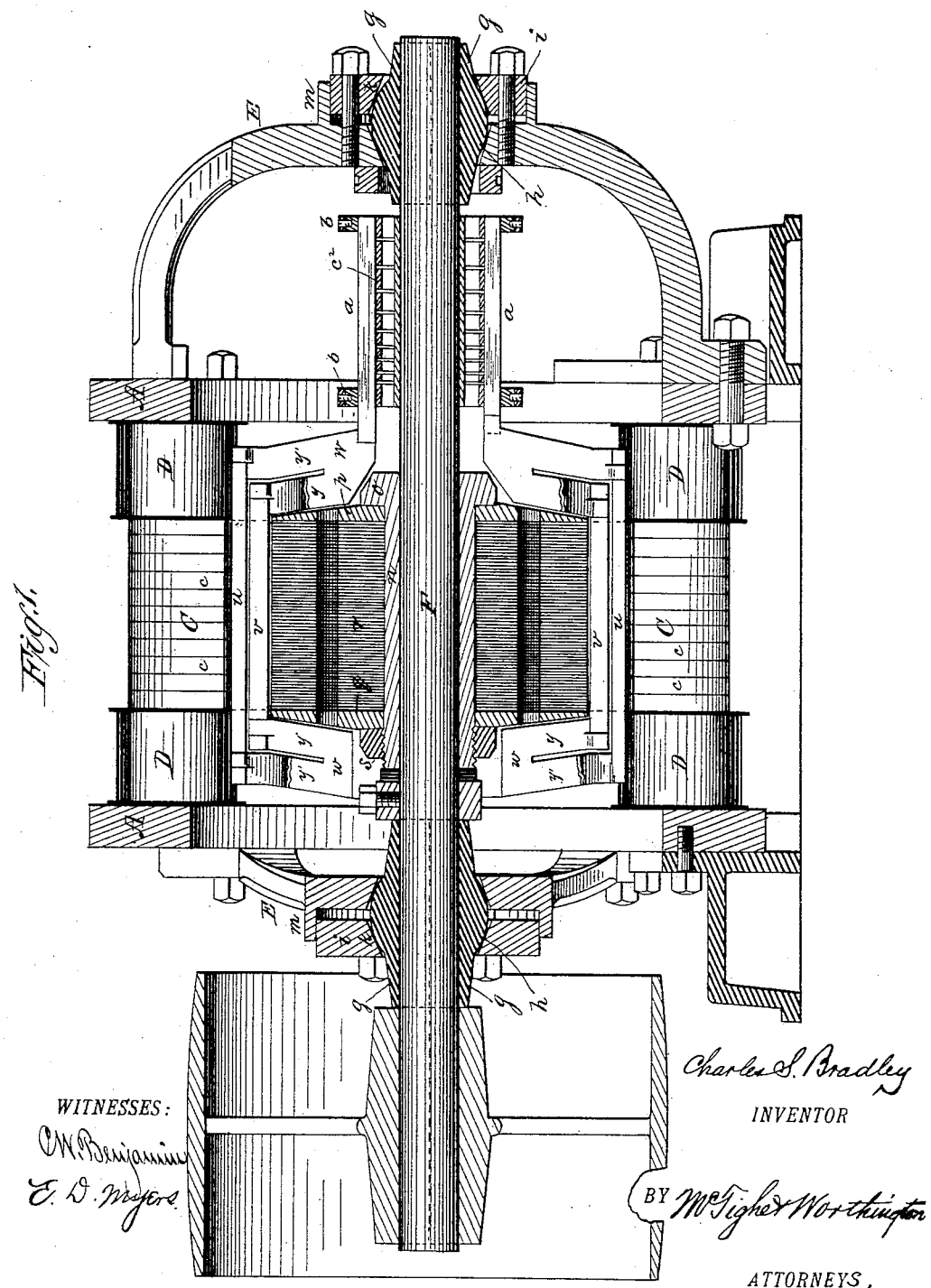
Figure 2:
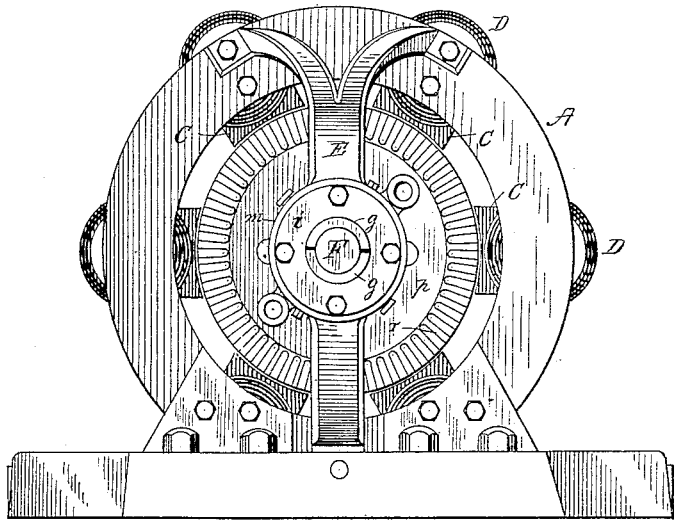
Figure 3:
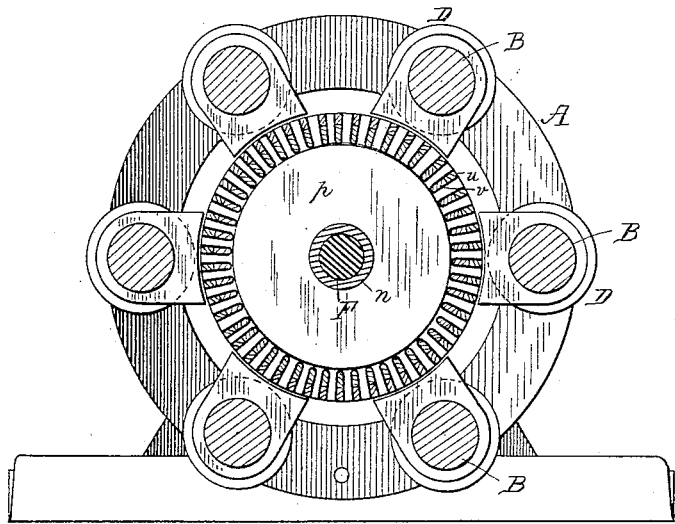

In the drawings forming a part of this specification, Figure 1 is a longitudinal vertical section of the complete machine, taken through the center. Fig. 2 is an end elevation, the armature not showing the winding. Fig. 3 is a transverse vertical section through the pole-pieces. Fig. 4 is a longitudinal vertical section of the commutator. Fig. 5 is a transverse section of the same. Fig. 6 is a perspective showing the improved connectors used. Fig. 7 is a side elevation of my improved bearing, the lower half of the journal-box being in section; and Fig. 8 is an end view of the boxes and shaft.

The drawings show a six-pole machine, and the field-magnets are constructed in the following manner: At each end is a heavy cast or wrought iron yoke, A, in the form of a ring, and between these are bolted the six magnet-cores B in a circular range equidistant apart. Each core carries at its center a laminated pole-piece, C, made up of a number of wrought-iron plates, $c$, slipped onto the core and prevented from turning thereon by a spline on the core and a notch in each plate. The coils D are then slipped on the remaining portions of the cores B and the whole retained firmly in position by bolting the yoke-rings A in place. Each polar face is so proportioned as to cover as many ribs of the armature as will equal in their combined section the section of the two cores which energize said pole-piece, as described in my said pending application, No. 245,172, and hence all lines of force emanating from a pole-piece are transmitted through the iron of the armature to the two adjacent poles of opposite polarity. The diameter of yoke-rings A inside is such as to afford an opening through which the armature may be readily inserted and withdrawn.

The end brackets, E, carry the self-adjusting bearings for the shaft F, upon which the armature is mounted. The journal-box $g\ g$ is formed spherical at its center, as indicated by $h$, and the two halves $g\ g$ are finished by sweating them together, boring and facing, and then separating and facing off the adjacent edges, so that when the two boxes are placed on the shaft they will not quite come together, and are kept true by suitable liners placed between their edges. Each of the brackets E has a conical central opening, which freely passes the ends of the boxes $g\ g$, but bears against their spherical surface $h$, which is held from the other direction by the follower-plate $i$, having a similar opening at its center. Bolts serve to draw these two conical faces against the sphere $h$, and thus hold the journal-boxes $g\ g$ against rotation or end motion.

To facilitate the centering and setting, I form an annulus, $m$, on the bracket E, closely fitting the follower-plate $i$. Obviously by this construction the wear on the boxes $g$ can be always taken up without in the least disturbing the true axial position of the shaft F, and hence the armature will always be perfectly central in the field.

An additional advantage lies in the ability to set the parting-line of the boxes at any angle, so that the pull of the belt may be always arranged in proper relation to the boxes.

The armature is constructed as follows: A sleeve, $n$, having flange $o$ at one end, is fitted to shaft F. Before placing it in position I first place on the sleeve $n$ a metal head, $p$, then slip over the sleeve a number of sheets of thin wrought-iron, $r$, insulated by paper, enamel, varnish, or otherwise, finishing with a metal head, $q$, similar to $p$, and clamp the whole mass closely together by the nut $s$, screwing on the threaded end of sleeve $n$, as shown.

The periphery of the armature is longitudinally grooved, as shown. Each groove receives two insulated conductor-bars (marked, respectively, $u$ and $v$,) preferably placed one on top of the other, as indicated, both bars projecting beyond the armature-core at the ends, but the outer bars, $u$, extending beyond the inner bars to afford access for connection in the manner explained in my said pending application. For the purposes of this application it is only necessary to state that the bar $u$ under one pole is to be connected to a bar, $v$, under the next pole, and so on. To effect this, I stamp out of a sheet of thick copper a slitted blank (as in my other application referred to) having the body $w$ and the arms $y\ y'$. The arms $y\ y'$ are pressed to such angle as to exactly reach the required distance, and each is again at its extremity bifurcated and so bent as to embrace the ends of the conductor-bars with an elastic pressure, after which they are soldered or otherwise permanently connected. Should this connection at any time get loose, the conductivity will still remain safe on account of the elastic pressure, as indicated clearly at Fig. 6.

At the commutator end the connector-body $w$ extends downward for connection to the commutator-bars. These bars $a$ may be held in any of the well-known ways. I show a pair of shrinkage-bands, $b$, clamping them on an annular sleeve, $c^2$, fitted on the shaft by the inward-extending shell. The sleeve $c^2$ is slitted circumferentially at a number of points without destroying its radial strength. This slitting is important in machines carrying a heavy current, as it breaks up to a very great extent the eddy-currents which are induced in the sleeve $c^2$ by the current traversing the bars $a$, and I thus avoid loss of energy and one source of annoying heat in the commutator. I prefer to make these slits more numerous toward the armature end of the commutator.

When the armature is held fast on the shaft and the connectors $w\ y$ are all fixed to their respective commutator-bars, the commutator needs no key or set-screw, as the connectors are heavy and act as braces in both directions to retain the commutator rigidly in one position. A still further function is performed by these connectors. In armatures of that type wherein the conductor is composed of bars with bar-to-bar connections at the ends it is highly important to have such connections of the lowest possible resistance. Hitherto designers have been content with making the sectional area of such connectors nearly or quite as large as the area of the bars. I go a step farther and effect two results—namely, the reduction of the resistance due to the connectors and the avoidance of loss of energy in the armature-conductor proper, due to rise of temperature, which, if not prevented, would cause an increase of resistance. I make my connectors of considerably greater sectional area than the bars, and, being of copper, like the bars, they have greater conductivity for heat; hence any tendency to a rise in temperature is checked by the superior heat conductivity of the connectors, which carry off all such heat from the bar ends, and therefore the increase of resistance in the bars by heating does not take place to any material or observable extent, and the armature remains cool during a long run. The connectors, besides having greater sectional area, are also of much greater surface and are exposed to the air, and therefore radiate whatever heat they receive from the bars, and thus they are themselves prevented from experiencing a rise of temperature.

I claim as my invention—

1. The combination of the solid iron core B and pole-piece C, made up of a number of iron plates, $c$, occupying planes at right angles to the axis of said core, and each plate perforated to receive said core within its periphery, substantially as described.

2. In an armature, the combination, with the conductors thereof, of the metallic bifurcated connectors, each fork being slotted to receive one of said conductors and uniting in a body portion adapted to connection with the commutator, substantially as set forth.

3. In an armature, the connector composed of the body $w$ and the forks $y\ y'$, all in one piece, said forks $y\ y'$ being bent apart to reach two different parts of the armature circumference, and each slitted at its outer end and bent to spring over the armature-conductors.

4. The combination, with a bar-commutator, of an internal metallic sleeve or shell insulated from the bars of the commutator and slitted circumferentially, substantially as described.

5. In a bar-armature, the combination, with the bars, of bifurcated end connectors having greater heat conducting and radiating capacity than said bars, substantially as described.

6. In a bar-armature, the combination, with the bars, of bifurcated end connectors of greater sectional area than the bars and having their surfaces exposed directly to the air, substantially as set forth.

7. In a bar-armature, the combination, with the bars, of bifurcated end connectors having greater electrical conductivity per unit of length than said bars, substantially as described.

In testimony whereof I affix my signature in presence of two witnesses.

CHARLES S. BRADLEY.

Witnesses:
T. J. McTIGHE,
W. L. CANDEE.